(12) United States Patent
Braaten et al.

(10) Patent No.: US 8,021,522 B2
(45) Date of Patent: Sep. 20, 2011

(54) REVERSE PIEZOELECTRIC METHOD FOR PRODUCTION OF SILANE

(75) Inventors: Orvar Braaten, Oslo (NO); Gunnar Braaten, legal representative, Oslo (NO); Arne Kjekshus, Gjetttum (NO); Tore Wessel-Berg, Trondheim (NO)

(73) Assignee: Elkem Solar AS, Oslo (NO)

( * ) Notice: Subject to any disclaimer, the term of this patent is extended or adjusted under 35 U.S.C. 154(b) by 275 days.

(21) Appl. No.: 12/280,267

(22) PCT Filed: Feb. 21, 2007

(86) PCT No.: PCT/NO2007/000064
§ 371 (c)(1),
(2), (4) Date: Feb. 12, 2009

(87) PCT Pub. No.: WO2007/097632
PCT Pub. Date: Aug. 30, 2007

(65) Prior Publication Data
US 2010/0252414 A1    Oct. 7, 2010

(30) Foreign Application Priority Data

Feb. 21, 2006  (NO) .................................. 20060829

(51) Int. Cl.
*C01B 33/00* (2006.01)
*C01B 3/02* (2006.01)

(52) U.S. Cl. ......... 204/157.45; 204/157.52; 204/157.15; 204/157.4

(58) Field of Classification Search ............. 204/157.15, 204/157.4, 157.45, 157.52, 157.42; 331/155; 422/139, 145, 186; 423/347
See application file for complete search history.

(56) References Cited

U.S. PATENT DOCUMENTS

| | | | | |
|---|---|---|---|---|
| 2,978,315 A | * | 4/1961 | Schenck et al. | 75/10.59 |
| 3,006,838 A | * | 10/1961 | Johnson | 422/186 |
| 3,068,069 A | * | 12/1962 | Jackson | 423/347 |
| 3,103,415 A | * | 9/1963 | Jackson | 423/347 |
| 3,499,947 A | * | 3/1970 | Johnson | 585/602 |
| 3,518,573 A | * | 6/1970 | Smith | 331/116 R |
| 3,674,430 A | * | 7/1972 | Neuegebauer et al. | 423/325 |

(Continued)

FOREIGN PATENT DOCUMENTS

DE    271461    9/1989

(Continued)

OTHER PUBLICATIONS

Campone, P. et al, "Hydrogen Desorption from Crystalline Quartz and Some Related Differential-Scanning Calorimetry and Conductivity Phenomena," Solid State Comm. 98(10), pp. 917-922, 1996.*

(Continued)

*Primary Examiner* — Keith Hendricks
*Assistant Examiner* — Colleen M Raphael
(74) *Attorney, Agent, or Firm* — Lucas & Mercanti, LLP

(57) ABSTRACT

The present invention relates to a method for production of silane where particulate quartz in a fluidized bed is treated with a gas containing hydrogen at a temperature below 0° C., with the quartz in the fluidized bed subjected to an alternating electric field having a frequency equal to the intrinsic resonant frequency of at least a part of the quartz particles to create vibrational energy in the particles, thereby causing a chemical reaction between quartz and hydrogen to produce silane. The invention also relates to an apparatus for carrying out the method.

6 Claims, 4 Drawing Sheets

U.S. PATENT DOCUMENTS

| | | | | |
|---|---|---|---|---|
| 3,936,765 A * | 2/1976 | Lewis et al. | | 331/1 R |
| 4,224,056 A * | 9/1980 | Tomizawa et al. | | 75/10.44 |
| 4,377,564 A * | 3/1983 | Dahlberg | | 423/349 |
| 4,868,013 A * | 9/1989 | Allen | | 427/213 |
| 4,890,667 A | 1/1990 | Lessor et al. | | |
| 5,596,311 A * | 1/1997 | Bess et al. | | 340/384.7 |
| 6,407,276 B1 * | 6/2002 | Lewis et al. | | 556/472 |
| 6,472,299 B2 * | 10/2002 | Hiraoka et al. | | 438/509 |
| 6,852,301 B2 * | 2/2005 | Block et al. | | 423/347 |
| 2003/0157000 A1 * | 8/2003 | Janssen et al. | | 422/139 |

FOREIGN PATENT DOCUMENTS

| | | | |
|---|---|---|---|
| GB | 881655 | | 11/1961 |
| JP | 48-39720 | * | 11/1973 |
| JP | 09093078 | | 4/1997 |
| SU | 1296208 A | * | 3/1987 |
| WO | 0144253 A | | 6/2001 |

OTHER PUBLICATIONS

Hasegawa, S. "Relationship between the stress and bonding properties of amorphous $SiN_x$:H films," J. Appl. Phys. 72(12), Dec. 15, 1992.*

Le Foulgoc, B. et al, "Highly decoupled single-crystal silicon resonators: an approach for the intrinsic quality factor," J. Micromech. Microeng. 16(2006) S45-S53.*

Tachibana, K. et al, "Diffusion of Si atoms and thin film deposition in a silane-argon plasma,", J. Phys. D; Appl. Phys 15 (1982), pp. 177-184.*

Hasegawa, S. et al, "Si-H and N-H vibrational properties in glow-discharge amorphous $SiN_x$:H films ($0 < x < 1 \sim 55$)," Appl. Phys. Lett. 57 (21), Nov. 19, 1990, pp. 2211-2213.*

Machine translation of WO 0144253A1.*

Hirao, T. et al, "Application of Penning discharge to the deposition of amorphous silicon," J. Appl. Phys. 52(12), Dec. 1981, pp. 7453-7455.*

Wang, Z. et al, "A New Method for Studying the Distribution of Induced Defects in Potential Wells in a-Si:H/a-$SiN_x$:H Multilayer," Chin. Phys. Lett. 11(9) 1994, pp. 573-576.*

Chunbao Xu, et al. Powder Technology, vol. 161, Issue 3, Feb. 3, 2006: Fluidization of fine particles in a sound field and identification of C/A particles using acoustic waves pp. 227-234.

Office Action dated Jan. 25, 2007 in Norwegian Patent Application No. 20060829.

Office Action dated Apr. 11, 2008 in Norwegian Patent Application No. 20060829.

* cited by examiner

REVERSE PIEZOELECTRIC METHOD FOR PRODUCTION OF SILANE

FIELD OF INVENTION

The present invention relates to an electrometallurgical processing method providing vibrational energy to piezoelectric crystals and more specifically to a method for production of silane ($Si_nH_{n+2}$) and to an apparatus for carrying out the method.

BACKGROUND ART

Today, electronic grade silicon and solar cell silicon are mainly produced by decomposition of trichlorosilane ($HSiCl_3$) or monosilane ($SiH_4$). $HSiCl_3$ is conventionally produced by reacting metallurgical grade silicon with HCl at temperatures in the range 300° C. to 1100° C. This process has a number of disadvantages. Several other compounds, particularly silicon tetrachloride $SiCl_4$, are produced in the process, causing reduced yield of $HSiCl_3$. Furthermore, due to the temperature requirement of about 1000-1100° C., the decomposition process of $HSiCl_3$ to silicon is characterized by low yield and large energy consumption. Moreover, during decomposition the reactor has to be cooled to prevent deposition of solid silicon on the reactor walls. Finally, due to the highly corrosive atmosphere, corrosion of the reactor is common.

The decomposition of monosilane into silicon is a far less energy demanding process with high yield. The decomposition takes place at a temperature as low as about 460° C. In the use of monosilane for production of electronic or solar cell grade silicon, the main problems are difficulties encountered in the production of monosilane gas. Today, the most common way of producing monosilane is a disproportionation process starting with $HSiCl_3$, but the yield of this process is low. Thus, there is a need for improved methods of producing monosilane.

DESCRIPTION OF INVENTION

In its broad aspect the present invention relates to a method for providing vibrational energy to particulate piezoelectric crystals in a fluidized bed, with the crystals subjected to an alternating electric field having a frequency equal to their intrinsic resonant frequency.

By the present invention it is further provided a method for production of silane directly from silicon dioxide by treating particulate piezoelectric quartz in a fluidized bed with a gas containing hydrogen at a temperature below 0° C. and providing an alternating electric field to the particulate quartz in the fluidized bed having a frequency equal to the intrinsic resonant frequency of the quartz particles to create vibrational energy in the piezoelectric quartz particles thereby causing a reaction between quartz and hydrogen to produce silane.

The reaction that is carried out by the method of the present invention is:

$$SiO_2(s) + 4H_2(g) \leftrightarrows SiH_4(g) + 2H_2O(s) \quad (1)$$

In order to avoid back reaction between silane and water, the temperature is kept below 0° C. Preferably the temperature is below −40° C.

The method of the present invention provides a simple low temperature process for the production of silane directly from quartz in an environmentally favourable process with water or ice as the only bi-product.

Finally, the present invention relates to an apparatus for production of silane consisting of a fluidized bed reactor having a gas flow distributor, a pipe for supplying hydrogen gas to the reactor, a closeable orifice for supplying particulate quartz to the reactor, an off gas pipe for sampling gases produced in the reactor, two or more electrodes connected to an electric power source for providing an alternating electric field between the electrodes, and a frequency regulator for adjustment of the frequency of the power source.

The apparatus comprises preferably two electrodes where the first electrode is preferably arranged axially inside the fluidized bed reactor. The second electrode is preferably arranged about the outer surface of the fluidized bed reactor. However, the electrodes may also both be placed diametrically opposite each other about the outer surface of the reactor, or in some other pattern about the outer surface of the fluidized bed reactor.

A device for removing water from the hydrogen gas circulating in the fluidized bed reactor is arranged between the supply pipe for hydrogen gas and the gas flow distributor of the fluidized bed reactor. The device for removing water is preferably a device for cooling the hydrogen gas to a temperature below 0° C. to remove water as solid ice, but other conventional means for removing water can be used.

DETAILED DESCRIPTION OF THE INVENTION

Quartz crystals are piezoelectric, so that when exposed to an alternating electric field they exhibit mechanical resonances at frequencies $f_0$ determined essentially by the crystal's linear dimensions. The resonance frequency for a regular flat polished quartz crystal of thickness t is given by $$f_0 = v/2t \quad (2)$$

where v is the velocity of mechanical waves in quartz, which is about 3000 m/sec. A flat crystal of 1 mm thickness would thus have a theoretical intrinsic frequency of $f_0 \approx 1.5$ MHz. In the resonant oscillation mode, the stress is zero and the strain maximum on the crystal surfaces. With the applied electric field E at frequency f the strain amplitude $S_{res}$ of the generated vibrations in a crystal of mass m may be expressed mathematically by the familiar resonance formula $$S_{res} = \frac{dE}{\sqrt{R^2 + 4\pi^2 m^2 (f - f_0)^2}} \quad (3)$$

where d is the piezoelectric coupling factor and R is a coefficient of dampening, i.e., a constant expressing the loss. At frequencies far off resonance the strain is basically given by $$S = dE \quad (4)$$

According to Eq. 3 the strain amplitude is maximum at the resonant frequency $f = f_0$, where $S_{res} = dE/R$, so that the resonance serves to enhance the basic strain S by a factor $\alpha$ given by $$\alpha = \frac{S_{res}}{S} = \frac{1}{R} \quad (5)$$

Because the intrinsic dampening R in the crystal is extremely small, the resonance enhancement $\alpha$ can be very large, perhaps 10000. This is exemplified by considering a typical case of quartz with a piezoelectric coupling factor $d \approx 10^{-12}$ m/V and electric field $E = 10^5$ V/m. The basic strain S is then equal to $10^{-7}$ m/m, so that the actual displacement on the surface of a 1 millimeter crystal far off resonance is $10^{-9}$ m=1 nanometer, which is quite small. However, with resonance enhancement corresponding to a reasonable value of α, say 10000, the surface displacement becomes as large as $10^{-5}$ m=0.01 mm, which then would be the displacement at the surface of the free vibrating crystal in absence of coupling to the external medium represented by the chemical process taking place with the ambient hydrogen gas, as shown in Eq. 1. Because strain is proportional to the electric field, a voltage higher than $10^5$ Volt/m would be advantageous. When the chemical process occurs, the energy transfer is represented by an extra external load $R_{ex}$ so that the overall R is given by $$R=R_i+R_{ex} \qquad (6)$$

In quartz crystals the intrinsic loss $R_i$ is extremely small and can be neglected compared with the external load $R_{ex}$ representing the energy transfer from the vibrating crystal to the environmental reactants, described in the process of Eq. 1. Thus, it is anticipated that vibrational energy is transferred to endothermic reduction of quartz to silan and water, with very little loss as internal heat in the quartz crystals.

The raw quartz crystal grows in the form of a hexagonal prism with pointed ends. The crystal structure is trigonal with three symmetry planes, so that the basic piezoelectric coupling between strain and applied electric field is expressed as a relation between tensor components, rather than the simple relation S=dE in Eq. 4. The overall resonance conditions are therefore considerably more complex than the simple one-dimensional case expressed in Eqs. 2-5. The anisotropic crystal structure gives rise to several different resonant frequencies, some of compressional type and some of shear type. All are characterized by zero stress and maximum strain on all crystal surfaces.

In addition to the multiple set of resonant frequencies arising from the anisotropic crystal structure itself, the expected random multifaceted shapes of exterior surfaces from the preparation process of the quartz particles are expected to cause further modifications of the resonant frequencies in some unknown fashion. Therefore, each crystal is expected to exhibit its own set of resonant frequencies, which are roughly inversely proportional to the linear dimensions of the crystal. The selection of frequencies for a given crystal size fraction is therefore subject to some uncertainty. The excitation of a specific resonance is contingent on having the right direction of the electric field relative to the crystal. In a fluidized bed reactor this comes about by the random motion and rotation of crystals which occasionally bring a crystal into optimum orientation for excitation at one of the resonant frequencies. A two-electrode system is characterized by a linearly polarized electric field. With four or more electrodes the electric field can be arranged to be circularly polarized, so that the field exhibits a continuous change of direction through a rotating motion, which serves as a further aid to the optimization of orientation.

Monosilane belongs to a group of unstable substances, the silicon hydrides, with the formula $Si_nH_{2n+2}$. Monosilane, itself being an exception, is a stable gas at room temperature with boiling point at −118° C. The strong endothermic character of the reaction in Eq. 1 suggests that it will only take place when adequate energy is put into it. Usually this is done by heating. With implementation of the piezoelectric effect the energy is in the form of mechanical strain of vibrations in the quartz crystals drawn from a high frequency electric generator, and high temperature is not needed. Operation at low temperature has the additional benefit of attaining maximum strain in the quartz crystals as well as transferring water to the solid state (ice), thereby minimizing the risk of back-reaction between silane and water. The random motions and collisions of quartz crystals in the fluidized bed reactor may be beneficial in making the crystals prone to chemical reactions.

SHORT DESCRIPTION OF THE DRAWINGS

Figure 1:
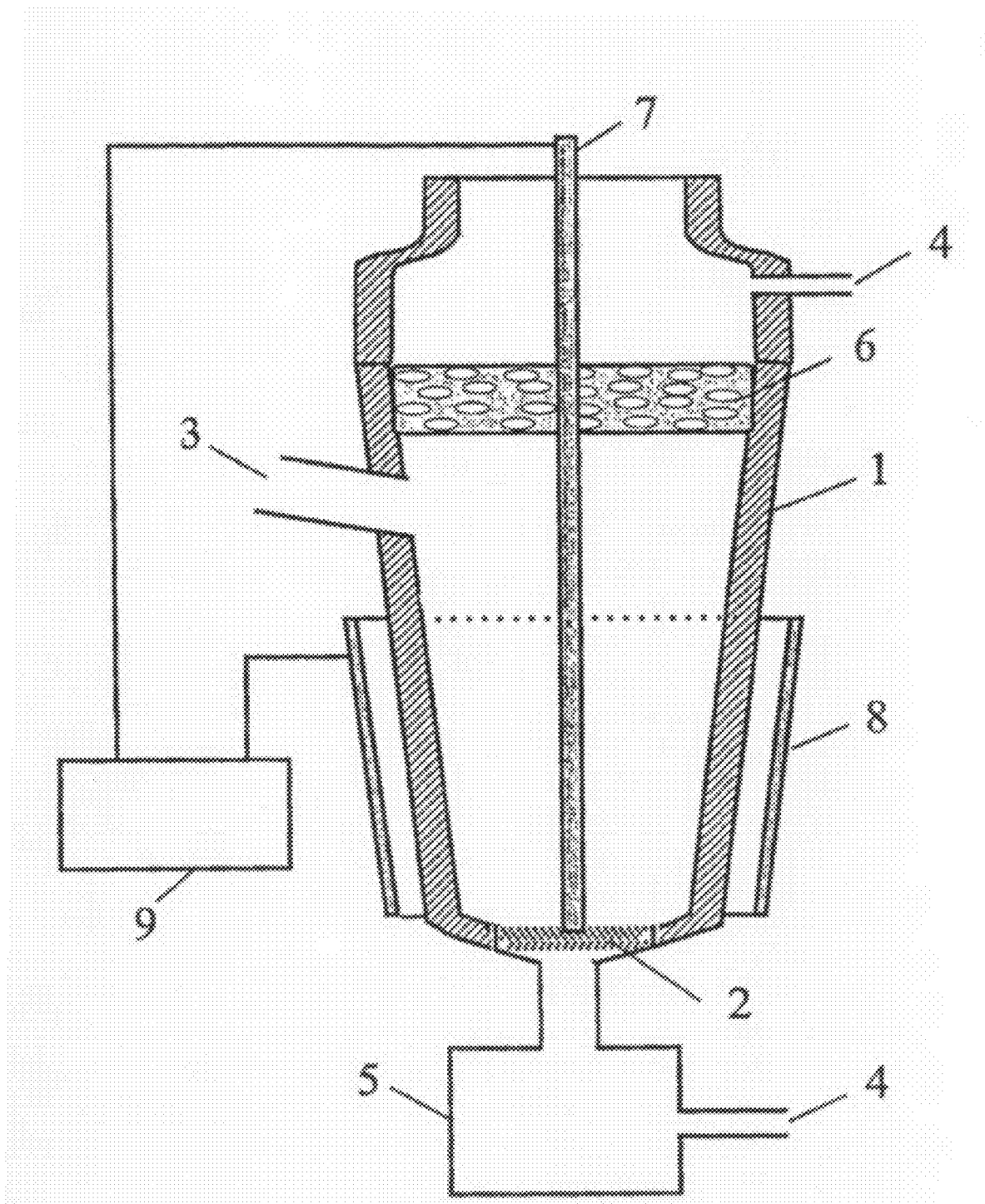
FIG. 1 is a schematic view of an apparatus according to the present invention.

An apparatus for production of silane according to the present invention is shown schematically in FIG. 1. The apparatus consists of a fluidized bed reactor 1 made of glass or other suitable material, preferably but not necessarily of circular cross-section. The reactor 1 has a closeable orifice 3 for supply of quartz particles. Hydrogen gas or a mixture of hydrogen gas and an inert gas is supplied via a pipe 4 to the gas flow distributor 2 of the fluidized bed reactor 1 via a cold trap 5 for cooling the gas to a temperature below 0° C. At the top of the fluidized bed reactor there is arranged a gas permeable filter 6 and above the filter 6 there is arranged a pipe 4 for re-circulating the gas. A center electrode 7 is arranged axially in the fluidized bed reactor 1. On the outside of the fluidized bed reactor 1 there is arranged a second electrode 8, which preferably surrounds the reactor 1. The center electrode 7 and the second electrode 8 are connected to a suitable alternating voltage source 9. The voltage source 9 has suitable means for regulating the frequency of the voltage supplied to the electrodes 7 and 8.

Before starting the reactor 1 quartz particles are supplied through the quartz supply orifice 3, whereupon the reactor 1 is flushed with hydrogen or an inert gas in order to remove air from its interior. Hydrogen or a mixture of hydrogen and an inert gas is then supplied through the supply pipe 4, cooled to a temperature below 0° C. in the cold trap 5, and then pumped through the gas flow distributor 2 of the reactor 1 causing fluidization of the quartz particles in the reactor 1. Alternating current is supplied from the power source 9 to the electrodes 7 and 8 to create an electrical field between the electrodes. The frequency of the electrical current is adjusted to match resonant frequencies of the quartz particles in the fluidized bed. The ensuing vibrational energy from the induced strain in the particles causes a reaction between the quartz particles and the ambient hydrogen to produce $SiH_4$ and water. The temperature in the reactor 1 is kept below 0° C. so that the water formed will be in solid form as ice.

Various other embodiments can be devised by those skilled in the art without departing from the spirit and scope of this invention.

EXAMPLE 1

Figure 2:
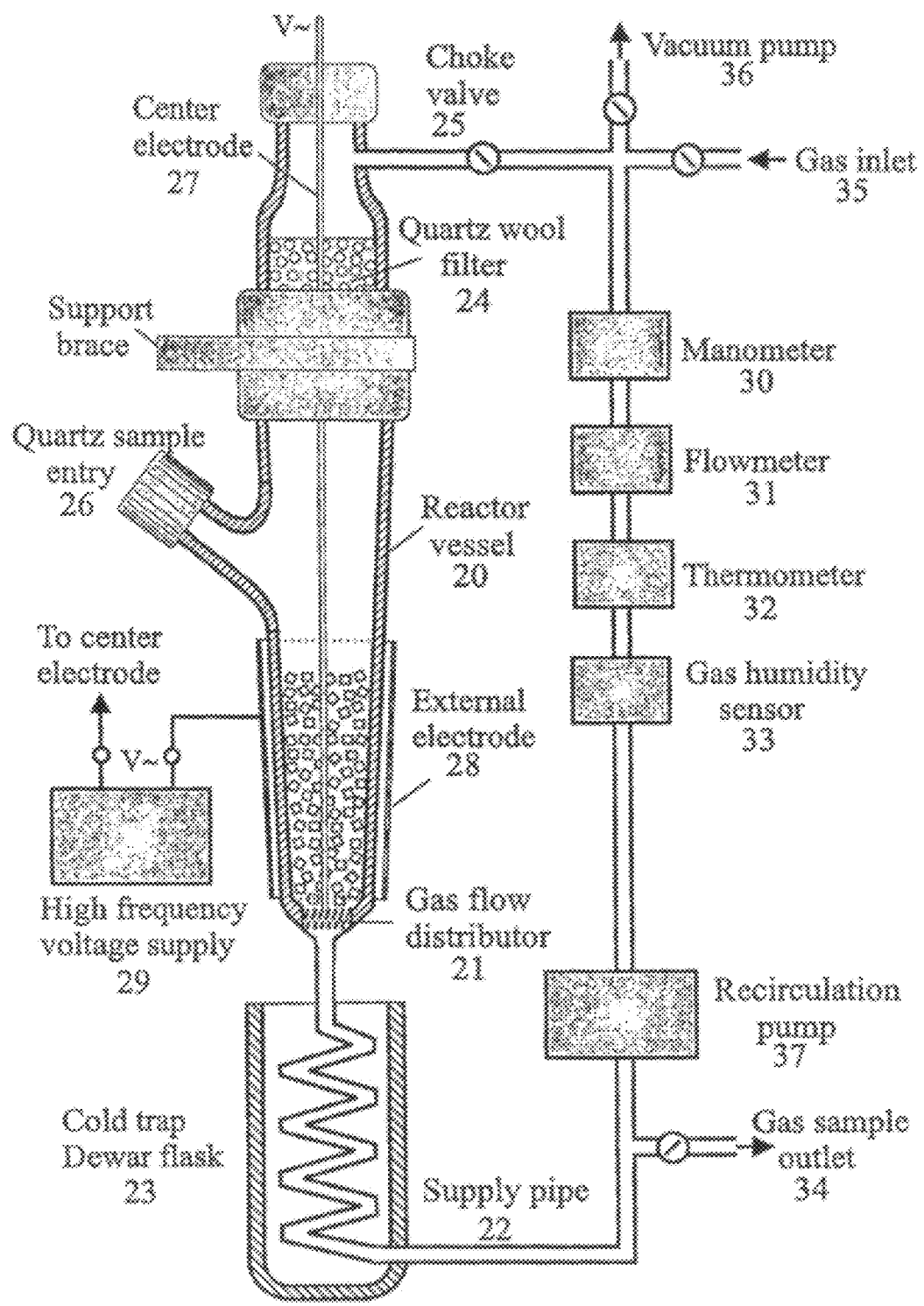
FIG. 2 is an apparatus used to carry out tests of the method according to the present invention.

The method according to the present invention was tested using the apparatus shown in FIG. 2. In the figure there is shown a fluidized bed reactor vessel 20 made from glass. The supply pipe 22 for hydrogen and argon runs through a cold trap 23 before entering the gas flow distributor 21. A quartz wool filter 24 is arranged near the top of the fluidized bed reactor vessel 20, and a choke valve 25 for gas flow adjustment is inserted in the gas outlet line. A supply pipe 26 is arranged for charging the fluidized bed reactor with quartz particles. A first electrode 27 is arranged axially in the fluidized bed reactor vessel 20 and a second electrode 28 is arranged about the outer surface of the fluidized bed reactor vessel 20. The electrodes 27 and 28 are connected to a high frequency voltage power supply 29 providing voltages up to 1000 Volt and having means for varying the frequency from approximately 0.5 MHz to 1.1 MHz.

The product gas is directed through a manometer 30, a flowmeter 31, a thermocouple 32, and a gas humidity sensor 33 before being recirculated to the gas supply pipe 22 by a recirculation pump 37. A gas sample outlet 34 is arranged in order to draw samples of the produced gas, and a gas inlet 35 is arranged for adding further hydrogen and argon to the system. Finally, there is arranged a vacuum pump 36 for evacuation of the reactor before start.

Experiments are carried out as follows: At the start of each experimental run the reactor is charged with particulate quartz, and the total volume of about 3 litre air contained in the reactor 20 is evacuated through the vacuum pump outlet 36. The reactor 20 is then flushed three times with argon from the gas inlet 35, followed by evacuation, before a gas mixture of 10% hydrogen and 90% argon is let into the system, with a final internal pressure of 1 bar. The gas mixture is recirculated through the reactor system by the recirculation pump 37 causing fluidization of the quartz crystals in the reactor vessel 20. The fluidization is controlled by visual inspection of the random motion of the quartz crystals, with adjustment of gas flow with the choke valve 25. The gas flow is adjusted to about 50 to 70 l/hr. During the fluidization process the quartz crystals are prevented from escaping through the top of the reactor by the quartz wool filter 24. The gas trace humidity sensor 33 of type MMY30-R-2-A-2-A from General Eastern Measurement & Sensing Technologies measures and records the dew point temperature of the gas mixture passing through it, covering the range −90° C. to +10° C. The dew point temperature, continuously recorded on an adjacent plotter, is the temperature at which the first sign of condensation of humidity appears upon cooling. In other words, the lower the displayed temperature, the lower is the water concentration in the gas mixture.

With the gas mixture circulating and the humidity sensor 33 turned on, the cold trap Dewar flask 23 is filled up with a mixture of solid carbon dioxide and ethanol to trap water from the circulating gas mixture prior to it re-entering the reactor vessel 20. After the dew point temperature is stable (may take several hours) the electric field is turned on.

During the random motion of the quartz crystals in the fluidized bed reactor vessel 20 the grains are from time to time in the correct orientation relative to the electric field to be in resonance. Also, the quartz crystals in the fluidized bed reactor vessel 20 will be subject to an autonomous grinding effect causing continuous formation of new surfaces exposed to hydrogen. Because the quartz crystals are of different shapes and also of varying sizes between 1.0 and 2.0 mm, the intrinsic resonance frequency of the quartz crystals is expected to differ from crystal to crystal. Therefore, in the search for possible resonances and for signs indicating that the reaction of Eq. 1 has taken place, the entire range of available frequencies 0.51, 0.60, 0.70, 0.81, 0.97, and 1.03 MHz, all with a superimposed frequency modulation, is employed. The applied voltage across the electrodes is approximately 800 volt, which is the maximum that can be obtained from the high frequency voltage supply 29.

Figure 3:
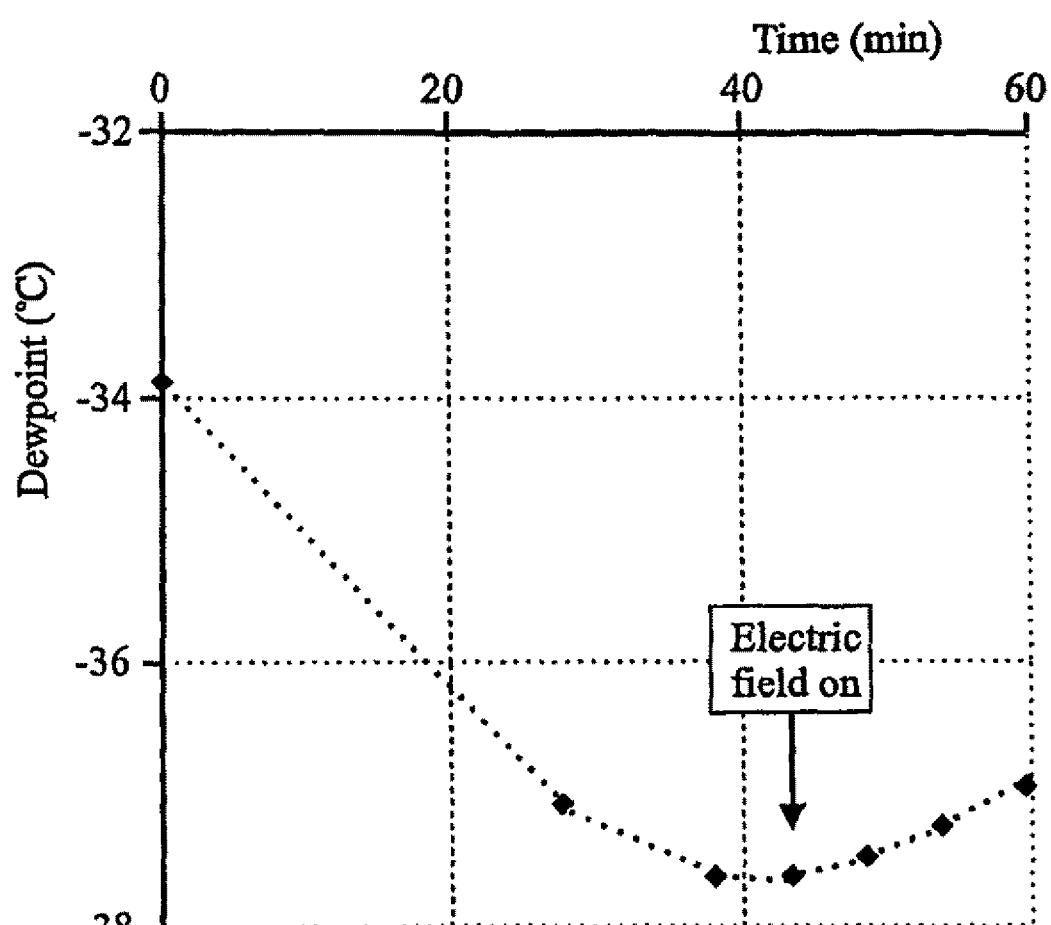
FIG. 3 is a diagram showing dew point measurements from Example 1.

The dew point is monitored to observe signs of formation of water, which is produced in the process in addition to silane. FIG. 3 shows a recording of dew point temperature versus time for a test run with frequency of 0.70 MHz. Time 0 refers to the starting time of gas flushing of the reactor system. While the dew point initially was above −34° C., it was reduced to about −38° C. during the gas recirculation. In this test run the recirculating gas consisted of 10% hydrogen and 90% argon. The vertical arrow indicates the point in time when the electric field is turned on. It is seen that during the 20 minutes when the gas mixture was circulating in the reactor with the electric field on, the dew point temperature rose to about −37° C., indicating that the reaction of Eq. 1 has taken place, producing silane and water. The observation is an indication that silane is produced by the method of the present invention.

EXAMPLE 2

Figure 4:
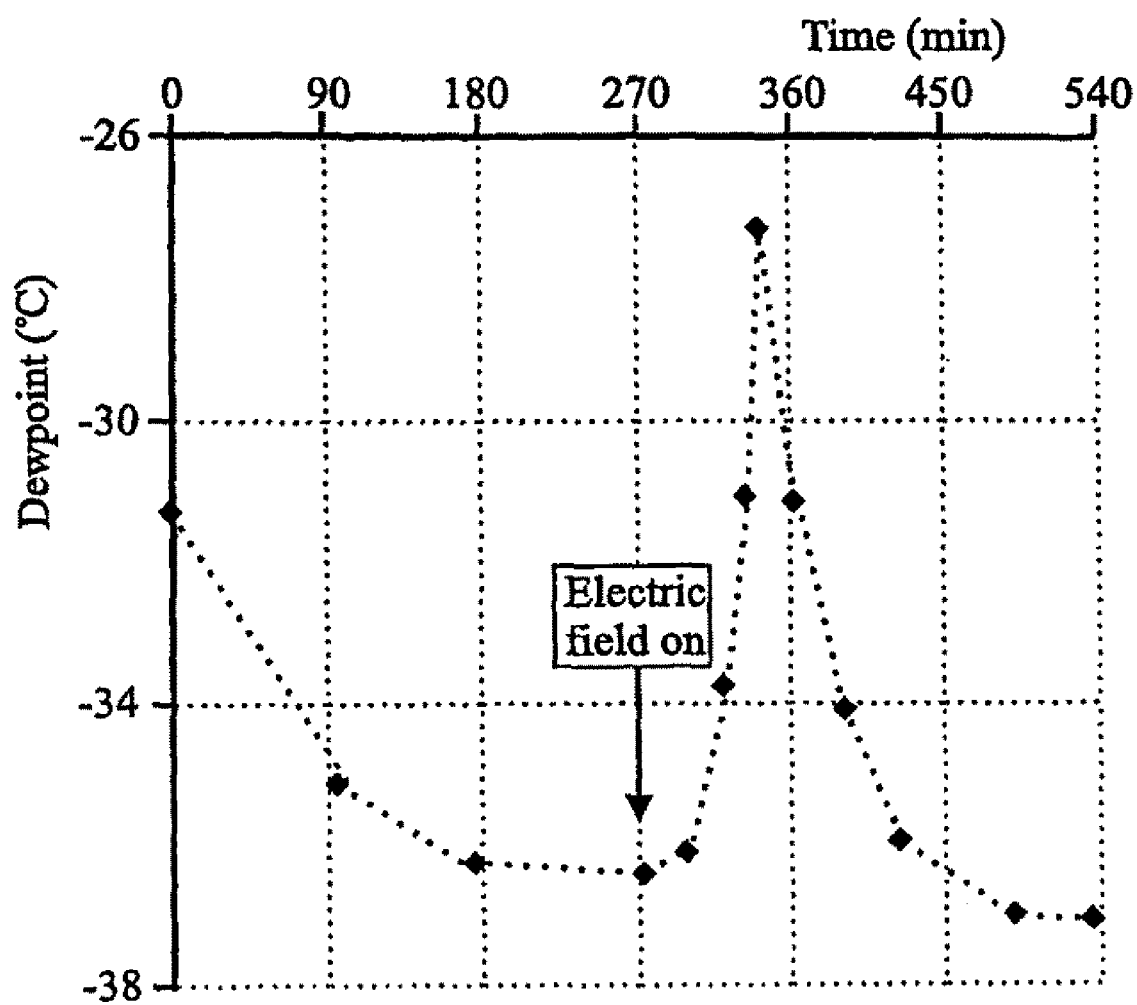
FIG. 4 is a diagram showing dew point measurements from Example 2.

The dew point measurements from a subsequent test run with the same apparatus and test procedure as described in Example 1, but with 50% hydrogen and 50% argon gas mixture and 0.93 MHz frequency, are shown in FIG. 4. After application of the electric field the dew point rose from about −37 to about −28° C., a clear indication that water and therefore also silane are produced according to the chemical reaction of Eq. 1. Because the volume of the recirculating gas in the test runs is a mere 3 litre, corresponding to about 1 mg of hydrogen, the most plausible explanation of the later rapid fall of dew point temperature to low values is that all hydrogen in the recirculating gas mixture was consumed in the chemical reaction.

The invention claimed is:

1. Method for production of silane comprising:
   providing particulate quartz in a fluidized bed;
   cooling a gas containing hydrogen to a temperature below 0° C.;
   treating the paricular quartz in the fluidized bed with the gas containing hydrogen;
   subjecting the particulate quartz in the fluidized bed to an alternating electric field;
   creating vibrational energy by regulating the frequency of a voltage supplied to electrodes in the fluidized bed such that the frequency is equal to the intrinsic resonant frequency of the particulate quartz; and
   causing a chemical reaction between the particulate quartz and hydrogen to produce silane, wherein the chemical reaction is created by the vibrational energy.

2. Method according to claim 1, characterized in that the temperature is kept below −40° C.

3. Method according to claim 1, characterized in that a power supply frequency is smaller or larger than a resonant frequency of the piezoelectric particles.

4. Method according to claim 1, characterized in that the frequency $f_0$ of a power supply is frequency modulated over a wide band $\Delta f_m$ according to $f=f_0 \pm \Delta f_m$ where $f_m \leq f_0$.

5. Method according to claim 1, characterized in that a power supply voltage is optimized to produce maximum vibration strain in the piezoelectric particles to maximize product yield.

6. Method according to claim 1, characterized in that a power supply voltage is increased until occurrence of gas discharge in the gas.

* * * * *